United States Patent

Voss

[15] 3,684,140
[45] Aug. 15, 1972

[54] CUTTER AND CUTTING METHOD

[72] Inventor: Raymond G. Voss, Bartlesville, Okla.

[73] Assignee: Phillips Petroleum Company

[22] Filed: Aug. 3, 1970

[21] Appl. No.: 60,579

[52] U.S. Cl. .......................... 225/2, 83/171, 83/176, 225/3, 225/96
[51] Int. Cl. ................................. B23b 5/04
[58] Field of Search............83/4, 100, 171, 176, 425; 225/2, 3, 93.5, 96

[56] References Cited

UNITED STATES PATENTS

| | | |
|---|---|---|
| 3,486,957 | 12/1969 | Fish..........................83/171 X |
| 3,109,339 | 11/1963 | Braun..............................83/4 |
| 3,465,625 | 9/1969 | Daly............................83/100 |
| 3,156,149 | 11/1964 | Frizelle.....................83/100 X |
| 3,179,317 | 5/1965 | Voelker......................83/4 X |

*Primary Examiner*—Andrew R. Juhasz
*Assistant Examiner*—David R. Melton
*Attorney*—Young and Quigg

[57] ABSTRACT

A batt of thermoplastic fibers is cut by a hot wire, the batt being compressed in the vicinity of the cut and a tension being applied to the batt transverse to the direction of the cut.

10 Claims, 3 Drawing Figures

PATENTED AUG 15 1972 3,684,140

INVENTOR.
R. G. VOSS

BY Young & Quigg

ATTORNEYS

CUTTER AND CUTTING METHOD

BACKGROUND OF THE INVENTION

This invention relates to method and apparatus for cutting. In one aspect it relates to a method for cutting batts of thermoplastic fibers. In another aspect it relates to an apparatus for trimming the edge of a batt of thermoplastic fibers.

Previously plastic fiber batts have been cut with a shearing action, for example by utilizing a rotary blade running in close contact with a metal roll. Such apparatus is subject to difficulties occasioned by small cut ends wrapping around bearings and shafts causing bearings to freeze or lock up. When making needle punched batts of plastic fibers, to facilitate the cutting operation it has been common practice to do the trimming after the needling operation thereby providing a dimensionally stable material which will withstand the mechanical handling during the cutting operation. However, it is desirable to trim the batt prior to needle punching so that the trimmed edge is available for reprocessing and utilizing as a feed material for the batt. When the batt is needled prior to trimming, the trimmed edge cannot readily be used as further feed in the batt producing operation. In utilizing a rotating shearing cutter the cutter becomes dull in a rather short time necessitating change of cutters or sharpening. When plastic materials have been cut with a heated cutter which slices through the material, the cut edge has been fused causing the formation of a thickened portion or a globule on the end of the fibers and there has been a problem due to the accumulation of the thermoplastic material on the heated cutter.

SUMMARY OF THE INVENTION

According to this invention a batt of thermoplastic fibers is cut by positioning a hot wire in the path of travel of the batt, compressing the batt in the vicinity of the wire and applying tension transverse to the direction of movement of the batt in the vicinity of the wire thereby cutting the batt without contact of the wire with the material forming the batt. By cutting the batt in this manner the problems associated with the use of shearing action rotary cutters are avoided. Because the material being cut does not contact the cutting wire the problem of the accumulation of such material on the wire is avoided.

The apparatus according to the invention includes means to move the batt in a predetermined path, means to position the hot cutting wire at a location where the batt is to be trimmed, means to compress the batt near the wire and means to apply a tension to remove the trimmed off part of the batt.

DESCRIPTION OF THE PREFERRED EMBODIMENTS

Figure 1:
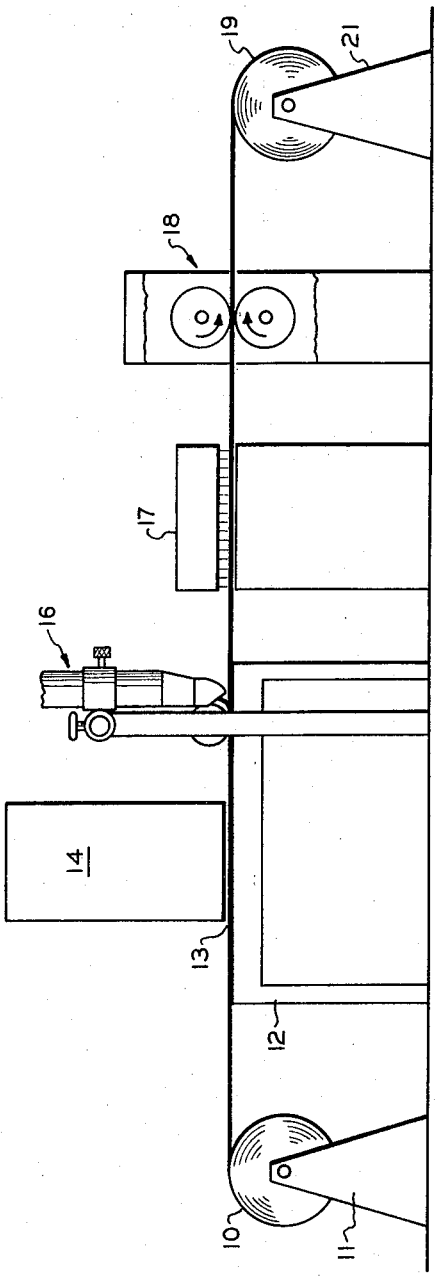
FIG. 1 is a diagrammatic elevation of a production line for a batt utilizing the invention.

Referring to FIG. 1, a roll of thermoplastic film 10 is rotatably supported on stand 11. The film passes over a table 12 and while supported thereon a batt of fibers 13 is laid upon film 10 by lap 14. As the film progresses to the right in FIG. 1 it carries batt 13 through cutter 16 and then to needle 17 and fusion rolls 18 and the needled and compressed product is wound into roll 19 supported on stand 21.

Figure 3:
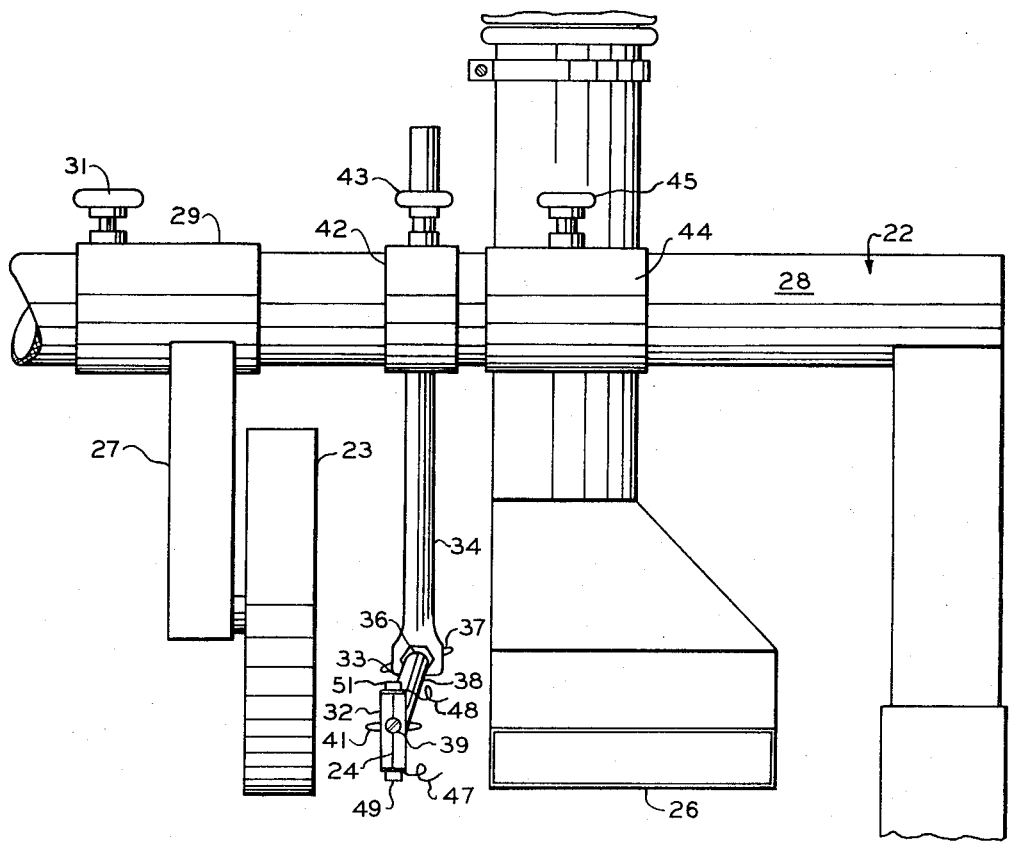
FIG. 3 is an elevation of the cutter of FIG. 2.
Figure 2:
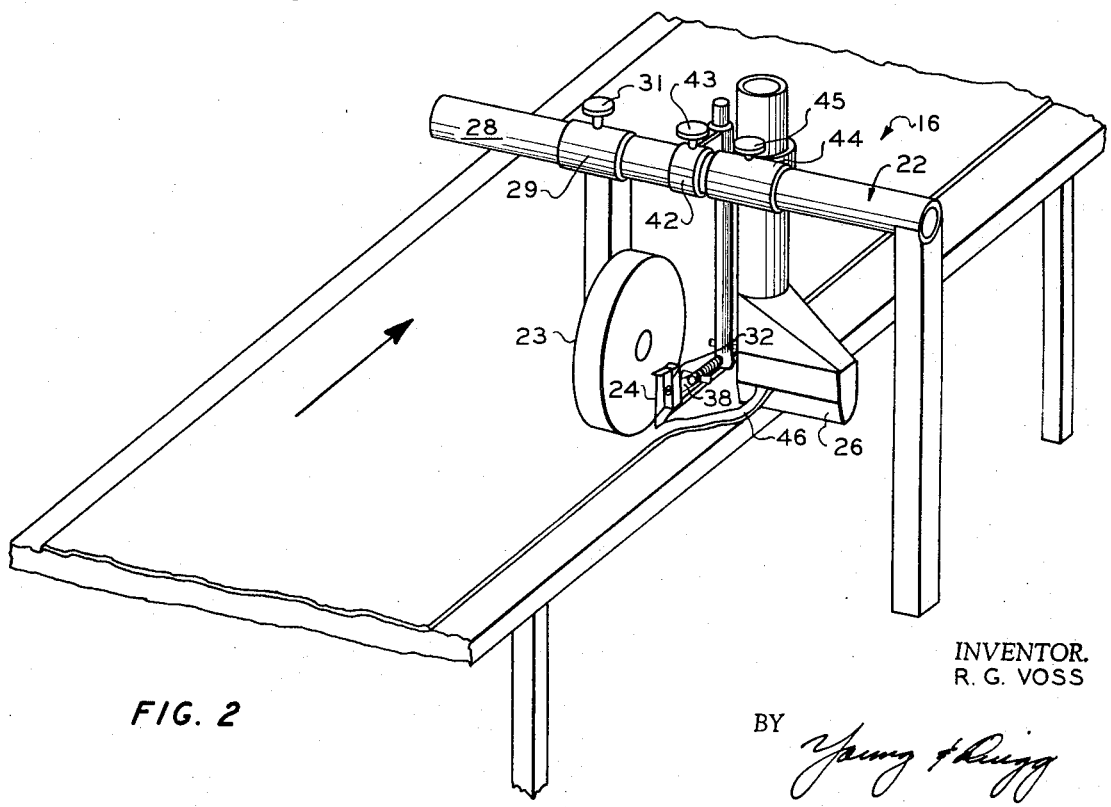
FIG. 2 is a diametric view, somewhat simplified, of the cutter of the invention.

Referring to FIG. 2 and FIG. 3, cutter 16 comprises a support 22, a compression wheel 23 a cutter wire 24 and a pickup nozzle 26.

Wheel 23 has a flat periphery adapted to compress the batt and is carried by wheel support member 27 carried on horizontal member 28 of support 22 by bracket 29 which is movable along horizontal member 28 but can be fixed in position thereon by knurled jig screw 31.

Cutting wire 24 is carried by a wire holding member 32 which in turn is supported by fine adjustment member 33 carried by vertical member 34. Fine adjustment member 33 is threaded on one end and passes through an opening in the lower end of vertical member 34 and is held in place thereon by nut 36 and wing nut 37. Member 33 has an offset portion 38 at the end of which there is a drilled opening. Wire holding member 32 is attached to this end of adjustment member 33 by screw 39 and a wing nut 41 on the end of screw 39. Vertical member 34 is attached to horizontal member 28 by bracket 42. Bracket 42 is positioned on horizontal member 28 by means of jig screw 43. Bracket 42 also has a vertical opening through which vertical member 34 extends and a jig screw (not shown) fixes the vertical member with respect to bracket 42.

When it is desired to position cutting wire 24 the unit is positioned laterally with respect to the edge of the batt 13 by loosening jig screw 43 and moving bracket 42 on member 28. The final adjustment of the lateral position can be made by turning adjustment member 33. The angular position of wire 24 can then be adjusted by adjusting wire holding member 32 on fine adjustment member 33. The vertical position can then be adjusted by moving vertical member 34 in bracket 42. The wire 24 may be positioned at a slight angle with the vertical to counteract the slight tilting of the edge of the batt caused by placing tension on the cut portion.

Pickup nozzle 26 is positioned on horizontal member 28 by bracket 44 which is adjustable by means of jig screw 45, nozzle 26 being adjustable vertically in bracket 44 and positioned therein by a jig screw (not shown). In operation, as the batt 13 moves in the direction of the arrow in FIG. 2 (to the right in FIG. 1) wheel 23 is turned and compresses the batt in the vicinity of wire 24. The cut portion 46, that is the part of the batt removed by trimming, is diverted and moved from the vicinity of the wire by nozzle 26, thereby applying a tension across the batt near the wire whereby the batt is cut without contact with the wire.

In the embodiment illustrated the batt is moved by the thermoplastic film sheet on which it rests and which becomes a part of the completed product after needle punching. The batt can also be moved by means of a woven or non-woven fabric used in the same manner as film 10 or can be moved by means of longitudinal threads or filaments which are moved in the desired direction and on which the batt is laid. If it is desired to make a batt without backing or longitudinally strengthening parts, the batt can be laid down on a moving belt which moves the batt through the first steps of the process.

Although the compression wheel with the flat periphery portion has been illustrated and is presently preferred means for compressing the batt, other means could be used such as for example a presser foot. Similarly, other means for diverting and removing the cut portion could be used such as powered mechanical rollers.

Wire 24 is provided with means to supply electrical power such as electrical leads 47 and 48 and the wire can be attached to member 32 in any desired manner such as for example screws 49 and 51 illustrated. The power to wire 24 can be controlled in any desired manner to provide the necessary cutting temperature. For example, the voltage can be controlled by means of a variable autotransformer while the current is controlled by a rheostat. If desired, temperature controlling as well as adjusting means can be utilized. In any event, the temperature is regulated by regulating the power supplied to the wire.

The temperature of the wire will be adjusted to give the desired cutting action for the polymer and the speed of movement of the batt desired.

What is claimed is:

1. Means for trimming a fibrous batt of thermoplastic material, comprising:
   means to move the batt in a predetermined path;
   a cutting wire which can be heated;
   means to position the wire at a location along the path where the batt is to be trimmed;
   means to compress the batt in the immediate vicinity of the wire; and
   means to divert the part of the batt removed by trimming and to move it from the vicinity of the wire thereby applying a tension to the batt transverse to the direction of movement of the batt near the wire.

2. The apparatus of claim 1 wherein the means to divert the part of the batt removed by trimming comprises suction means.

3. The apparatus of claim 2 wherein the means to position a wire includes adjustable means to change the position of the wire with respect to the batt and to orient the wire in a desired angular relationship with the batt.

4. The apparatus of claim 2 wherein means to compress the batt is a rotatable wheel having a flat periphery.

5. The apparatus of claim 2 wherein the means to position a wire includes:
   a horizontal member supported in fixed relation with the means to move the batt at right angles to the direction of travel of the batt; and
   a vertical member supported on the horizontal member and movable along the length of the horizontal member and vertically at right angles thereto.

6. The apparatus of claim 5 wherein the means to position the wire also includes:
   a fine adjustment member attached to the lower part of the vertical member and movable thereon to adjust the position of the wire laterally with respect to the edge of the batt; and
   a wire holding member attached to the fine adjustment member and movable thereon to adjust the angle of the wire with respect to the batt.

7. The apparatus of claim 6 wherein the means to compress the batt comprises a wheel having a flat periphery, the wheel being carried by a wheel support member supported on the horizontal member and movable along the length thereof and vertically at right angles thereto.

8. The apparatus of claim 7 wherein the fine adjustment member also is adjustably movable on the vertical member in the direction of travel of the batt.

9. The apparatus of claim 5 wherein the suction means is supported on the horizontal member and movable along the length thereof and vertically at right angles thereto.

10. The method of trimming a fibrous batt of thermoplastic material comprising:
    moving the batt in a predetermined path;
    positioning a hot wire in the path of travel of the batt;
    compressing the batt in the vicinity of the wire; and
    applying tension transverse to the direction of movement of the batt in the vicinity of the wire whereby the batt is cut without contact of the wire with the material forming the batt.

* * * * *